(12) United States Patent
Shi et al.

(10) Patent No.: US 11,886,534 B2
(45) Date of Patent: Jan. 30, 2024

(54) FILTERING METHOD AND SYSTEM OF PARALLEL COMPUTING RESULTS

(71) Applicant: Inspur Electronic Information Industry Co., Ltd., Jinan (CN)

(72) Inventors: Hongzhi Shi, Jinan (CN); Haiwei Liu, Jinan (CN); Jian Zhao, Jinan (CN)

(73) Assignee: Inspur Electronic Information Industry Co., Ltd., Jinan (CN)

( * ) Notice: Subject to any disclaimer, the term of this patent is extended or adjusted under 35 U.S.C. 154(b) by 120 days.

(21) Appl. No.: 17/615,582

(22) PCT Filed: Sep. 29, 2019

(86) PCT No.: PCT/CN2019/108942
§ 371 (c)(1),
(2) Date: Nov. 30, 2021

(87) PCT Pub. No.: WO2021/027037
PCT Pub. Date: Feb. 18, 2021

(65) Prior Publication Data
US 2022/0236994 A1    Jul. 28, 2022

(30) Foreign Application Priority Data

Aug. 15, 2019    (CN) .......................... 201910755046.7

(51) Int. Cl.
*G06F 17/00*    (2019.01)
(52) U.S. Cl.
CPC ................................... *G06F 17/00* (2013.01)
(58) Field of Classification Search
CPC ........... G06F 17/00; G06F 9/3851; G06F 1/08
(Continued)

(56) References Cited

U.S. PATENT DOCUMENTS

| | | | |
|---|---|---|---|
| 2014/0310720 | A1 | 10/2014 | Song |
| 2017/0199844 | A1 | 7/2017 | Burchard |
| 2019/0095776 | A1 | 3/2019 | Kfir |

FOREIGN PATENT DOCUMENTS

| | | | |
|---|---|---|---|
| CA | 2984155 A1 | 11/2016 | |
| CN | 102446131 A | 5/2012 | |

(Continued)

OTHER PUBLICATIONS

Search Report and Written Opinion, PCT/CN2019/108942, dated May 14, 2020.
Chinese Office Action, Application No. 201910755046.7.

*Primary Examiner* — Tan V Mai
(74) *Attorney, Agent, or Firm* — David R. Stevens; Stevens Law Group (57) ABSTRACT

The present invention discloses a filtering method and system of parallel computing results, through simultaneously generating the input value of the first valid position fvp of each fragment, and simultaneously computing to obtain the output result corresponding to the input value of each first valid position fvp with the respective first valid position fvp of each fragment, and according to the output result of the first valid position fvp of the first fragment, the parallel computing results are filtered through the manner of selecting the output results of the second to the S-th fragments in sequence, to finally obtain correct parallel computing results. In the present invention, through adopting the manner of parallel filtering, the original serial filtering computation is changed to parallel computation of S fragments, the computing time is only one S-th of the original time, thereby improving the computing efficiency and satisfying the timing requirements of parallel computation.

5 Claims, 3 Drawing Sheets

(58) Field of Classification Search
USPC .......................................... 708/524, 300, 316
See application file for complete search history.

(56) References Cited

FOREIGN PATENT DOCUMENTS

| | | | |
|---|---|---|---|
| CN | 104102472 A | 10/2014 | |
| CN | 104283742 A | 1/2015 | |
| CN | 104361110 A | 2/2015 | |
| CN | 105049061 A | 11/2015 | |
| CN | 105808582 A | 7/2016 | |
| CN | 107220024 A | 9/2017 | |
| CN | 107807845 A | 3/2018 | |
| WO | WO-2016131425 A1 * | 8/2016 | ............. G06F 3/023 |

* cited by examiner

FILTERING METHOD AND SYSTEM OF PARALLEL COMPUTING RESULTS

The present application claims the priority of Chinese patent application filed with the China Patent Office on Aug. 15, 2019, with the application number of 201910755046.7 and entitled "Filtering Method and System of Parallel Computing Results", the contents of which are incorporated herein by reference in its entirety.

TECHNICAL FIELD

The present invention relates to the technical field of digital circuits, in particular to a filtering method and system of parallel computing results.

BACKGROUND

Currently, in the design and development process of digital circuits such as application specific integrated circuit (ASIC) and field-programmable gate array (FPGA), the design of parallel computation is generally adopted, to perform multiple computations in parallel at the same moment, to improve the computing performance and efficiency. However, when a strong data dependency relationship exists between multiple parallel computations, for example, a serial relationship exists between multiple computations in time, the parallel computing efficiency will be influenced, and now it is more common to adopt the method of advanced computation to improve the efficiency of parallel computation.

Since each way of the computing results need to rely on the previous way of computing results for computation, if advanced computation is directly performed, the parallel computing results will be incorrect, and two filtering methods of the parallel computing results are now available, in the first filtering method, in a clock cycle of parallel computation, the first valid position (fvp) of each way of output is determined in sequence according to the time serial order of multiple computations, and then the correct parallel computing results are confirmed according to fvp, but once the serial computing circuit is long, it will lead to the fact that the time spent in confirming fvp will exceed the parallel computation by one time period, resulting in errors in the computation, which cannot meet the timing requirements of parallel computation.

SUMMARY OF THE INVENTION

The present invention provides a filtering method and system of parallel computing results, to solve the problem in the prior art that due to the relatively long serial computing circuit, the time spent in confirming the fvp exceeds parallel computation by a time period, which may lead to errors during computation, and the timing requirements of parallel computation cannot be satisfied.

To achieve the above objective, the present invention provides the following technical solutions:

a filtering method of parallel computing results includes:

dividing the received N-way parallel computing results into S fragments, wherein S=$\sqrt{N}$, and both S and N are positive integers greater than 0;

simultaneously initializing each fragment separately and generating input values of all the first valid positions fvp required for each fragment to perform filtering computation;

simultaneously computing with input values of the first valid position fvp respectively corresponding to each fragment, to obtain an output result corresponding to the input value of each first valid position fvp; wherein the output result includes the output result of the first valid position fvp and the output result of parallel computation;

selecting one of a plurality of output results of the second fragment as the final output result according to the output result of the first valid position fvp of the first fragment, and selecting one of a plurality of output results of the third fragment as the final output result according to the output result of the first valid position fvp of the second fragment, to finally obtain the final output results of all the fragments, wherein the output result corresponding to the input value of the first valid position fvp of the first fragment is the final output result of the first fragment; and combining the output results of parallel computation in the final output results of all the fragments to obtain filtered parallel computing results.

Optionally, the filtering method further includes: selecting the positive integer S value closest to S=$\sqrt{N}$ if the splitting result of N-way parallel computing result according to S=$\sqrt{N}$ is not an integer, and taking the remaining parallel computing result as the $(S+1)^{th}$ fragment.

Optionally, the input values of all the first valid positions fvp include: the input value of the first valid position fvp of the first fragment is the value of the first valid position fvp obtained after filtering the N-way parallel computing results of the previous clock cycle; S types of input values of the first valid position fvp of the second fragment are available, which are respectively fvp=S, fvp=S+1, fvp=S+2 … fvp=S+S−1, fvp≥S+S; … and S types of input values of the first valid position fvp of the S-th fragment are available, which are respectively fvp=SS−S, fvp=SS−S+1 … fvp=SS−1, fvp=SS.

Optionally, the filtering method further includes:

taking the output result of the first valid position fvp of the S-th fragment as the input value of the first valid position fvp of the first fragment when the N-way parallel computing result in the next clock cycle is filtered.

Optionally, the selecting one of a plurality of output results of the second fragment as the final output result according to the output result of the first valid position fvp of the first fragment, and selecting one of a plurality of output results of the third fragment as the final output result according to the output result of the first valid position fvp of the second fragment, to finally obtain the final output results of all the fragments includes:

according to the output result of the first valid position fvp of the first fragment, selecting an input value corresponding to the output result of the first valid position fvp of the first fragment among the input values of the first valid position fvp of the second fragment, and taking the output result of the first valid position fvp obtained through computation of corresponding input value and the output result of parallel computation as the final output result of the second fragment;

according to the output result of the first valid position fvp in the final output result of the second fragment, selecting the input value corresponding to the output result of the first valid position fvp in the final output result of the second fragment among the input values of the first valid position fvp of the third fragment, and taking the output result of the first valid position fvp obtained from computation of the input value corresponding to the output result of the first valid position fvp among the final output result of the second fragment and the output result of parallel computation as the final output result of the third fragment, to finally obtain the final output result of all the fragments, wherein the output result of the first valid position fvp and the output result of parallel computation of the first fragment are the final output results of the first fragment.

A filtering system of parallel computing results includes:

a fragment unit, configured to divide the received N-way parallel computing results into S fragments, wherein $S=\sqrt{N}$, and both S and N are positive integers greater than 0;

a generation unit, configured to simultaneously initialize each fragment separately and generate the input values of all the first valid positions fvp required for each fragment to perform filtering computation;

a computation unit, configured to simultaneously compute with input values of the first valid position fvp respectively corresponding to each fragment, to obtain an output result corresponding to the input value of each first valid position fvp; wherein the output result includes the output result of the first valid position fvp and the output result of parallel computation;

a selection unit, configured to select one of a plurality of output results of the second fragment as the final output result according to the output result of the first valid position fvp of the first fragment, and select one of a plurality of output results of the third fragment as the final output result according to the output result of the first valid position fvp of the second fragment, to finally obtain the final output results of all the fragments, wherein the output result corresponding to the input value of the first valid position fvp of the first fragment is the final output result of the first fragment; and a combining unit, configured to combine the output results of parallel computation in the final output results of all the fragments to obtain filtered parallel computing results.

Optionally, the fragment unit is further configured to select the positive integer S value closest to $S=\sqrt{N}$ if the splitting result of N-way parallel computing result according to $S=\sqrt{N}$ is not an integer, and take the remaining parallel computing result as the $(S+1)^{th}$ fragment.

Optionally, all the input values of the first valid position fvp include: the input value of the first valid position fvp of the first fragment is the value of the first valid position fvp obtained after filtering the N-way parallel computing results of the previous clock cycle; S types of input values of the first valid position fvp of the second fragment are available, which are respectively fvp=S, fvp=S+1, fvp=S+2 ... fvp=S+S−1, fvp≥S+S; ... and S types of input values of the first valid position fvp of the S-th fragment are available, which are respectively fvp=SS−S, fvp=SS−S+1 ... fvp=SS−1, fvp=SS.

Optionally, the combining unit is further configured to take the output result of the first valid position fvp of the S-th fragment as the input value of the first valid position fvp of the first fragment when the N-way parallel computing result in the next clock cycle is filtered.

Optionally, the selection unit is configured to select the input value corresponding to the output result of the first valid position fvp of the first fragment in the input value of the first valid position fvp of the second fragment according to the output result of the first valid position fvp of the first fragment, and take the output result of the first valid position fvp obtained from computation of the corresponding input value and output result of parallel computation as the final output result of the second fragment;

and the selection unit is configured to select the input value corresponding to the output result of the first valid position fvp in the final output result of the second fragment among the input values of the first valid position fvp of the third fragment according to the output result of the first valid position fvp among the final output results of the second fragment, and take the output result of the first valid position fvp obtained from computation of the input value corresponding to the output result of the first valid position fvp in the final output result of the second fragment and the output result of parallel computation as the final output result of the third fragment, to finally obtain the final output result of all the fragments, wherein the output result of the first valid position fvp and the output result of parallel computation of the first fragment are the final output results of the first fragment.

From the above technical solution, it can be known that, the present invention discloses a filtering method and system of parallel computing results, through simultaneously generating the input value of the first valid position fvp of each fragment, and simultaneously computing to obtain the output result corresponding to the input value of each first valid position fvp with the respective first valid position fvp of each fragment, and according to the output result of the first valid position fvp of the first fragment, the parallel computing results are filtered through the manner of selecting the output results of the second to the S-th fragments in sequence, to finally obtain correct parallel computing results. In the present invention, through adopting the manner of parallel filtering, the original serial filtering computation is changed to parallel computation of S fragments, the computing time is only one S-th of the original time, thereby improving the computing efficiency and satisfying the timing requirements of parallel computation.

BRIEF DESCRIPTION OF THE DRAWINGS

In order to more clearly illustrate the technical solutions in the embodiments of the present application or the prior art, the accompanying drawings to be used in the description of the embodiments or the prior art will be briefly introduced, apparently, the accompanying drawings in the following description are merely embodiments of the present invention, and other drawings can be obtained from the provided drawings without any creative effort by those skilled in the art.

DETAILED DESCRIPTION OF THE EMBODIMENTS

The technical solutions in the embodiments of the present application will be described clearly and completely below in combination with the accompanying drawings in the embodiments of the present invention, apparently, the described embodiments are a part but not all of the embodiments of the present invention. Based on the embodiments in the present invention, all the other embodiments obtained by those skilled in the art without any creative effort shall all fall within the protection scope of the present invention.

It can be known from the background art that, since each way of the computing results need to rely on the previous way of computing results for computation, if advanced computation is directly performed, the parallel computing results will be incorrect, and two filtering methods of the parallel computing results are now available, in the first filtering method, in a clock cycle of parallel computation, the first valid position (fvp) of each way of output is determined in sequence according to the time serial order of multiple computations, and then the correct parallel computing results are confirmed according to fvp, but once the serial computing circuit is long, it will lead to the fact that the time spent in confirming fvp will exceed the parallel computation by one time period, resulting in errors in the computation, which cannot meet the timing requirements of parallel computation.

In view of this, the present invention provides a filtering method and system of parallel computing results, to solve the problems that in the prior art, since the serial computing circuit is long, it will lead to the fact that the time spent in confirming fvp will exceed the parallel computation by one time period, resulting in errors in the computation, which cannot meet the timing requirements of parallel computation.

Figure 1:
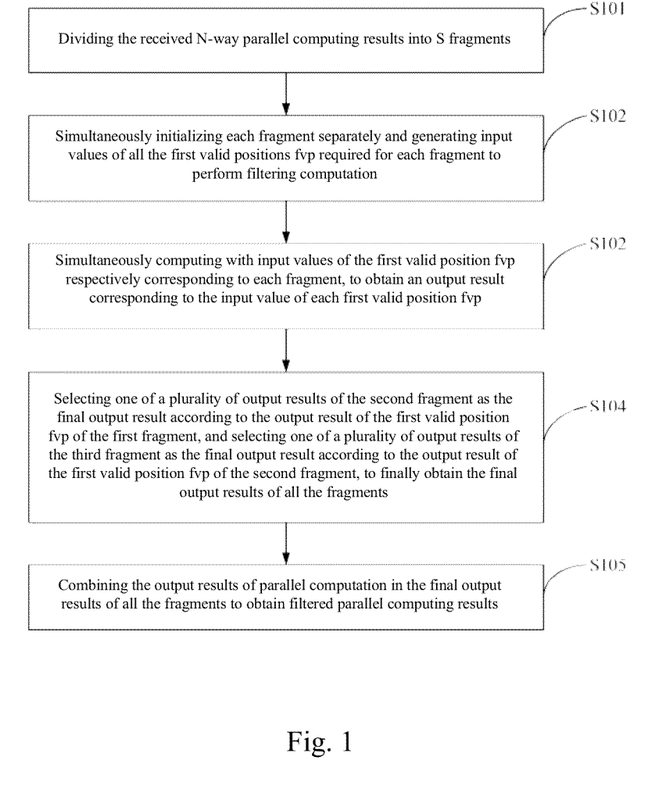
FIG. 1 is a flow chart of a filtering method of parallel computing results disclosed in the embodiment of the present invention.

As shown in FIG. 1, the embodiment of the present invention discloses a filtering method of parallel computing results, including the following steps:

S101, dividing the received N-way parallel computing results into S fragments, wherein $S=\sqrt{N}$, and both S and N are positive integers greater than 0.

Optionally, the positive integer S value closest to $S=\sqrt{N}$ is selected if the splitting result of N-way parallel computing result according to $S=\sqrt{N}$ is not an integer, and the remaining parallel computing result is taken as the $(S+1)^{th}$ fragment.

It should be noted that, since the number of circuits for multiple parallel computations is not a fixed value, therefore, there may be cases in which the received N-way parallel computing results cannot be split exactly according to $S=\sqrt{N}$, for example, when N is equal to 18, that is, the received 18-way parallel computing results, then the closest splitting method is S=4, that is, the 18-way parallel computing results are divided into 4 fragments, each fragment has 4-way parallel computing results, with 2-way parallel computing results still being remained, at this time, the remaining 2-way parallel computing results are taken as the fifth fragment. During practical application, specific data of N and S can be allocated flexibly according to the time sequence and resource resources, and the splitting exactly according to $S=\sqrt{N}$ may be achieved as much as possible.

S102: simultaneously initializing each fragment separately and generating input values of all the first valid positions fvp required for each fragment to perform filtering computation.

Optionally, the input values of all the first valid positions fvp include: the input value of the first valid position fvp of the first fragment is the value of the first valid position fvp obtained after filtering the N-way parallel computing results of the previous clock cycle; S types of input values of the first valid position fvp of the second fragment are available, which are respectively fvp=S, fvp=S+1, fvp=S+2 . . . fvp=S+S−1, fvp≥S+S; . . . and S types of input values of the first valid position fvp of the S-th fragment are available, which are respectively fvp=SS−S, fvp=SS−S+1 . . . fvp=SS−1, fvp=SS.

It should be noted that, since the input value of the first valid position fvp for the first fragment is the value of the first valid position fvp obtained after filtering the N-way parallel computing results of the previous clock cycle, therefore, the first fragment has only one known input value. While starting from the second fragment, each fragment has multiple possible input values for the first valid position fvp.

Figure 2:
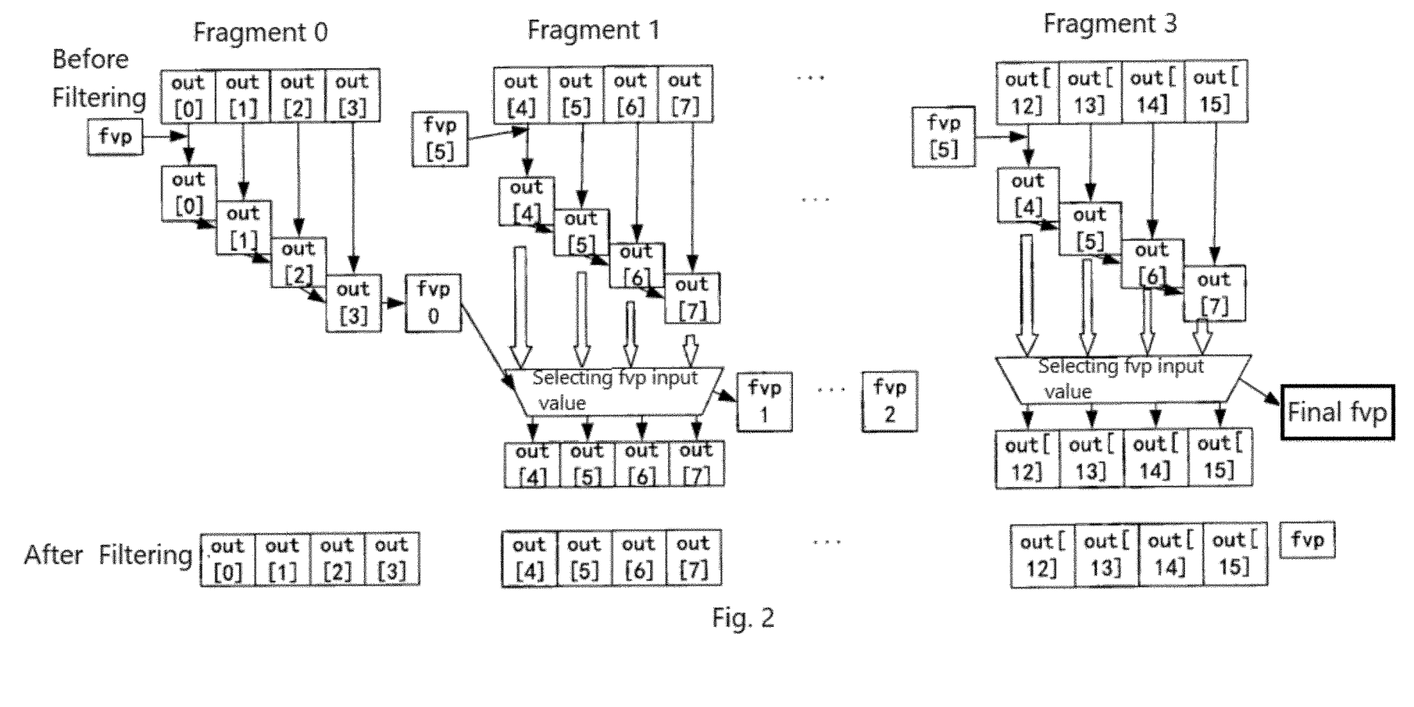
FIG. 2 is a flow diagram of a filtering method of another parallel computing result disclosed in the embodiment of the present invention.

It should be noted that, although N-way parallel computing results are received, however, the serial number of N-way parallel computing results starts from 0, with S=4 and N=16 as an example, as shown in FIG. 2, it can be seen that the serial numbers of 16-way parallel computing results before filtering are out[0] to out[15].

Therefore, the serial number of the first fragment in the present invention is out[0] to out[S−1], the serial number of the second fragment is out[S] to out[2S−1], and with the second fragment as an example, fvp=S means that the first fragment does not cover the data of the second fragment, valid parallel computing results start from the initial position out[S] of the current fragment; fvp=S+1 means that the first fragment covers the data of the second fragment out[S], and the valid parallel computing result starts from the second position of the current fragment, i.e., starting from out[S+1]; fvp=S+2 means that the first fragment covers the data of the second fragment out[S] to out[S+1], the valid parallel computing result starts from the third position of the current fragment, i.e., out[S+2]; and so on, until the last position of the second fragment is out[S+S−1], and when fvp≥S+S, it means that the first fragment covers the data of the second fragment out[S] to out[S+S−1], i.e., the first fragment covers all the positions of the second fragment. All the data of the current parallel computing result are invalid and should be set to 0.

It can be known from the above contents that, different fvp input values may obtain different results, in the present embodiment, all the possible fvp input values are listed and are subjected to advanced computation, to obtain their respective results, then since the only correct fvp value obtained by the first fragment selects the same fvp value from all the possible fvp input values of the second fragment, then the result corresponding to the fvp input value can be directly obtained at this time.

S103, simultaneously computing with input values of the first valid position fvp respectively corresponding to each fragment, to obtain an output result corresponding to the input value of each first valid position fvp; wherein the output result includes the output result of the first valid position fvp and the output result of parallel computation.

It should be further noted that, it can be seen that steps S102 and S103 are performed at the same time for each fragment. Assuming that the time consumed for N-way serial filtering in the original method is N*T, the consumption time in each fragment is computed as (N/S)*T, wherein the consumption of the unified integration process only involves simple selection operations, and the time is negligible, so the reduced time of all the computing processes is (N/S)*T/(N*T)=1/S times of the original time, thereby improving the speed of the filtering process and making the filtering time satisfy the timing requirements of parallel computation.

S104, selecting one of a plurality of output results of the second fragment as the final output result according to the output result of the first valid position fvp of the first fragment, and selecting one of a plurality of output results of the third fragment as the final output result according to the output result of the first valid position fvp of the second fragment, to finally obtain the final output results of all the fragments, wherein the output result corresponding to the input value of the first valid position fvp of the first fragment is the final output result of the first fragment.

In step S104, since the input value of the first valid position fvp of the first fragment is known and only one input value is available, therefore, the output result corresponding to the input value of the first valid position fvp of the first fragment is just the final output result of the first fragment.

Specifically, according to the output result of the first valid position fvp of the first fragment, the input result corresponding to the output result of the first valid position fvp of the first fragment is selected from the input value of the first valid position fvp of the second fragment, and the output result of the first valid position fvp computed by using the corresponding input value and the output result of parallel computation are taken as the final output result of the second fragment;

according to the output result of the first valid position fvp in the final output result of the second fragment, the input value corresponding to the output result of the first valid position fvp in the final output result of the second fragment among the input values of the first valid position fvp of the third fragment is selected, the output result of the first valid position fvp obtained through computation of the input value corresponding to the output result of the first valid position fvp in the final output result of the second fragment and the output result of parallel computation are taken as the final output result of the third fragment, the computation of the next fragment is proceeded through the same method, to finally obtain the final output results of all the fragments, wherein the output result of the first valid position fvp of the first fragment and the output result of parallel computation are the final output result of the first fragment.

S105, combining the output results of parallel computation in the final output results of all the fragments to obtain filtered parallel computing results.

It should be noted that, each fragment obtains the filtered S-way parallel computing results, and combines all the parallel computing results to obtain a complete, filtered and correct parallel computing results with a length of N, to take as a final result of parallel computation.

Optionally, the filtering method further includes:

taking the output result of the first valid position fvp of the S-th fragment as the input value of the first valid position fvp of the first fragment when the N-way parallel computing result in the next clock cycle is filtered.

It should be noted that, after obtaining the final result of parallel computation, the N-way parallel computation of the current clock cycle is completed, the N-way computation of the next clock cycle begins, it is known from the above contents that, the input value of the first valid position fvp of the first fragment of the current clock cycle is the output result of the final first valid position fvp obtained through N-way parallel computation of the previous clock cycle, then the final fragment of the N-way parallel computation of the current clock cycle, that is, the output result of the first valid position fvp of the S-th fragment is just the output result of the final first valid position fvp obtained through N-way parallel computation of the current clock cycle, and the output result is continuously taken as the input value of the first valid position fvp of the first fragment when the N-way parallel computing results of the next clock cycle are filtered.

As to the filtering method of parallel computing results disclosed in the present embodiment, through simultaneously generating the input value of the first valid position fvp of each fragment, and simultaneously computing to obtain the output result corresponding to the input value of each first valid position fvp with the respective first valid position fvp of each fragment, and according to the output result of the first valid position fvp of the first fragment, the parallel computing results are filtered through the manner of selecting the output results of the second to the S-th fragments in sequence, to finally obtain correct parallel computing results. In the present invention, through adopting the manner of parallel filtering, the original serial filtering computation is changed to parallel computation of S fragments, the computing time is only one S-th of the original time, thereby improving the computing efficiency and satisfying the timing requirements of parallel computation.

Figure 3:
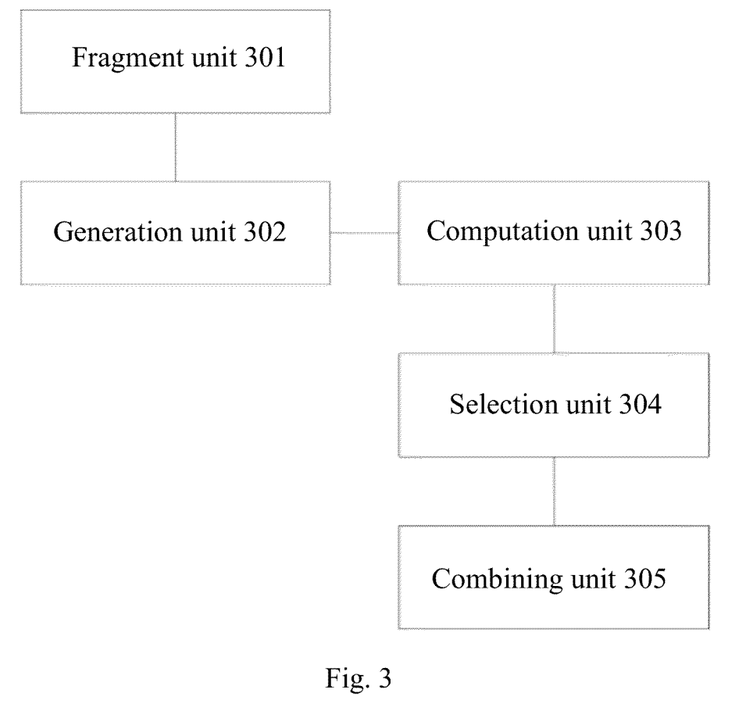
FIG. 3 is a structural schematic diagram of a filtering system of a parallel computing result disclosed in the embodiment of the present invention.

Based on the filtering method of parallel computing results disclosed in the embodiment of the present invention, FIG. 3 specifically discloses a filtering system of parallel computing results applying the filtering method of parallel computing results.

As shown in FIG. 3, another embodiment of the present invention discloses a filtering system of parallel computing results, and the system includes:

a fragment unit 301, configured to divide the received N-way parallel computing results into S fragments, wherein $S=\sqrt{N}$, and both S and N are positive integers greater than 0;

a generation unit 302, configured to simultaneously initialize each fragment separately and generate the input values of all the first valid positions fvp required for each fragment to perform filtering computation;

a computation unit 303, configured to simultaneously compute with input values of the first valid position fvp respectively corresponding to each fragment, to obtain an output result corresponding to the input value of each first valid position fvp; wherein the output result includes the output result of the first valid position fvp and the output result of parallel computation;

a selection unit 304, configured to select one of a plurality of output results of the second fragment as the final output result according to the output result of the first valid position fvp of the first fragment, and select one of a plurality of output results of the third fragment as the final output result according to the output result of the first valid position fvp of the second fragment, to finally obtain the final output results of all the fragments, wherein the output result corresponding to the input value of the first valid position fvp of the first fragment is the final output result of the first fragment; and a combining unit 305, configured to combine the output results of parallel computation in the final output results of all the fragments to obtain filtered parallel computing results.

Optionally, the fragment unit 301 is further configured to select the positive integer S value closest to $S=\sqrt{N}$ if the splitting result of N-way parallel computing result according to $S=\sqrt{N}$ is not an integer, and take the remaining parallel computing result as the $(S+1)^{th}$ fragment.

Optionally, all the input values of the first valid position fvp include: the input value of the first valid position fvp of the first fragment is the value of the first valid position fvp obtained after filtering the N-way parallel computing results of the previous clock cycle; S types of input values of the first valid position fvp of the second fragment are available, which are respectively fvp=S, fvp=S+1, fvp=S+2 ... fvp=S+S−1, fvp≥S+S; ... and S types of input values of the first valid position fvp of the S-th fragment are available, which are respectively fvp=SS−S, fvp=SS−S+1 ... fvp=SS−1, fvp=SS.

Optionally, the combining unit 305 is further configured to take the output result of the first valid position fvp of the S-th fragment as the input value of the first valid position fvp of the first fragment when the N-way parallel computing result in the next clock cycle is filtered.

Optionally, the selection unit 304 is configured to select the input value corresponding to the output result of the first valid position fvp of the first fragment in the input value of the first valid position fvp of the second fragment according to the output result of the first valid position fvp of the first fragment, and take the output result of the first valid position fvp obtained from computation of the corresponding input value and output result of parallel computation as the final output result of the second fragment;

and the selection unit is configured to select the input value corresponding to the output result of the first valid position fvp in the final output result of the second fragment among the input values of the first valid position fvp of the third fragment according to the output result of the first valid position fvp among the final output results of the second fragment, and take the output result of the first valid position fvp obtained from computation of the input value corresponding to the output result of the first valid position fvp in the final output result of the second fragment and the output result of parallel computation as the final output result of the third fragment, to finally obtain the final output result of all the fragments, wherein the output result of the first valid position fvp and the output result of parallel computation of the first fragment are the final output results of the first fragment.

For the specific working process of the fragment unit 301, the generation unit 302, the computation unit 303, the selection unit 304, and the combining unit 305 in the filtering system of the parallel computing results disclosed in the above embodiments of the present invention, please refer to the corresponding contents in the filtering method of parallel computing results disclosed in the above embodiments of the present invention, which will not be repeated redundantly herein.

In the filtering system of parallel computing results disclosed in the present embodiment, through simultaneously generating the input value of the first valid position fvp of each fragment, and simultaneously computing to obtain the output result corresponding to the input value of each first valid position fvp with the respective first valid position fvp of each fragment, and according to the output result of the first valid position fvp of the first fragment, the parallel computing results are filtered through the manner of selecting the output results of the second to the S-th fragments in sequence, to finally obtain correct parallel computing results. In the present invention, through adopting the manner of parallel filtering, the original serial filtering computation is changed to parallel computation of S fragments, the computing time is only one S-th of the original time, thereby improving the computing efficiency and satisfying the timing requirements of parallel computation.

It should also be noted that, the terms "include", "comprise", or any other variation thereof are intended to cover non-exclusive inclusion, such that a process, method, article, or device including a set of elements includes not only those elements, but also other elements not expressly listed or also includes elements inherent to such process, method, article, or device. Without further limitation, the inclusion of an element as defined by the statement "including a . . . " does not preclude the existence of additional identical elements in the process, method, article, or device including the element.

Those skilled in the art should understand that, the embodiment of the present application can be provided as a method, a system or a computer program product. Therefore, the present application may adopt the form of a complete hardware embodiment, a complete software embodiment, or an embodiment combining software and hardware. Moreover, the present application may adopt the form of a computer program product implemented on one or more computer usable storage media (including but not limited to disk storage, CD-ROM, optical storage, etc.) containing computer usable program codes.

The above are only embodiments of the present application, and are not used to limit the present application. For those skilled in the art, various modifications and variations may be made to the present application. Any modification, equivalent substitution, improvement and the like made within the spirit and principle of the present application shall be included in the scope of the claims of the present application.

The invention claimed is:

1. A method for filtering parallel computing results, comprising:

receiving N-way parallel computing results from a digital circuit, wherein the digital circuit comprises application specific integrated circuit (ASIC) and field-programmable gate array (FPGA);

dividing the received N-way parallel computing results into S fragments, where $S=\sqrt{N}$, and both S and N are positive integers greater than 0;

simultaneously initializing each fragment separately and generating input values of all the first valid positions fvp required for each fragment to perform filtering computation;

simultaneously computing with input values of the first valid position fvp respectively corresponding to each fragment, to obtain an output result corresponding to the input value of each first valid position fvp; wherein the output result comprises the output result of the first valid position fvp and the output result of parallel computation;

selecting one of a plurality of output results of the second fragment as the final output result according to the output result of the first valid position fvp of the first fragment, and selecting one of a plurality of output results of the third fragment as the final output result according to the output result of the first valid position fvp of the second fragment, to finally obtain the final output results of all the fragments, wherein the output result corresponding to the input value of the first valid position fvp of the first fragment is the final output result of the first fragment;

combining the output results of parallel computation in the final output results of all the fragments to obtain filtered parallel computing results; and according to the output result of the first valid position fvp of the first fragment, the parallel computing results is filtered through selecting the output results of the second to the S-th fragments in sequence, to finally obtain correct parallel computing results, so that the original serial filtering computation is changed to parallel computation of S fragments.

2. The filtering method according to claim 1, further comprising: selecting the positive integer S value closest to $S=\sqrt{N}$ if the splitting result of N-way parallel computing result according to $S=\sqrt{N}$ is not an integer, and taking the remaining parallel computing result as the $(S+1)^{th}$ fragment.

3. The filtering method according to claim 1, wherein, the input values of all the first valid positions fvp comprise: the input value of the first valid position fvp of the first fragment is the value of the first valid position fvp obtained after filtering the N-way parallel computing results of the previous clock cycle; S types of input values of the first valid position fvp of the second fragment are available, which are respectively fvp=S, fvp=S+1, fvp=S+2 fvp=S+S−1, fvp≥S+S; . . . and S types of input values of the first valid position fvp of the S-th fragment are available, which are respectively fvp=SS−S, fvp=SS−S+1 fvp=SS−1, fvp=SS.

4. The filtering method according to claim 1, further comprising:
    taking the output result of the first valid position fvp of the S-th fragment as the input value of the first valid position fvp of the first fragment when the N-way parallel computing result in the next clock cycle is filtered.

5. The filtering method according to claim 1, wherein, the selecting one of a plurality of output results of the second fragment as the final output result according to the output result of the first valid position fvp of the first fragment, and selecting one of a plurality of output results of the third fragment as the final output result according to the output result of the first valid position fvp of the second fragment, to finally obtain the final output results of all the fragments comprises:
    according to the output result of the first valid position fvp of the first fragment, selecting an input value corresponding to the output result of the first valid position fvp of the first fragment among the input values of the first valid position fvp of the second fragment, and taking the output result of the first valid position fvp obtained through computation of corresponding input value and the output result of parallel computation as the final output result of the second fragment;
    according to the output result of the first valid position fvp in the final output result of the second fragment, selecting the input value corresponding to the output result of the first valid position fvp in the final output result of the second fragment among the input values of the first valid position fvp of the third fragment, and taking the output result of the first valid position fvp obtained from computation of the input value corresponding to the output result of the first valid position fvp among the final output result of the second fragment and the output result of parallel computation as the final output result of the third fragment, to finally obtain the final output result of all the fragments, wherein the output result of the first valid position fvp and the output result of parallel computation of the first fragment are the final output results of the first fragment.

* * * * *